United States Patent [19]
Maytal

[11] Patent Number: 6,092,095
[45] Date of Patent: Jul. 18, 2000

[54] REAL-TIME TASK MANAGER FOR A PERSONAL COMPUTER

[75] Inventor: Benjamin Maytal, Mevasseret Zion, Israel

[73] Assignee: Smart Link Ltd., Netanya, Israel

[21] Appl. No.: 08/775,385

[22] Filed: Dec. 30, 1996

[30]       Foreign Application Priority Data

Jan. 8, 1996  [IL]  Israel ........................................ 116708

[51] Int. Cl.[7] .................................................. G06F 9/00
[52] U.S. Cl. ........................................... 709/100; 709/102
[58] Field of Search ................................... 395/670, 673, 395/677; 375/222; 702/182; 709/100, 102, 104, 106, 107

[56]            References Cited

U.S. PATENT DOCUMENTS

| | | | |
|---|---|---|---|
| 4,736,318 | 4/1988 | Delyani et al. ......................... | 709/103 |
| 5,291,694 | 3/1994 | Baker et al. ............................... | 451/38 |
| 5,392,448 | 2/1995 | Frankel et al. ............................ | 712/35 |
| 5,541,955 | 7/1996 | Jacobsmeyer ............................ | 375/222 |
| 5,628,013 | 5/1997 | Anderson et al. ....................... | 709/107 |
| 5,721,922 | 2/1998 | Dingwall .................................. | 709/103 |

*Primary Examiner*—Majid A. Banankhah
*Attorney, Agent, or Firm*—Ladas & Parry

[57]            ABSTRACT

A real-time manager for a personal computer manages the operation of real-time tasks while the personal computer also performs other tasks. The real-time manager includes at least one real-time kernel and a task service manager. The real-time kernel activates and controls the real-time tasks. The task service manager allocates time between the real-time tasks and the other tasks, selects the service levels of the real-time tasks in response to the activity levels of the other tasks, and invokes the real-time kernel to activate and control the real-time tasks at the selected service levels.

28 Claims, 8 Drawing Sheets

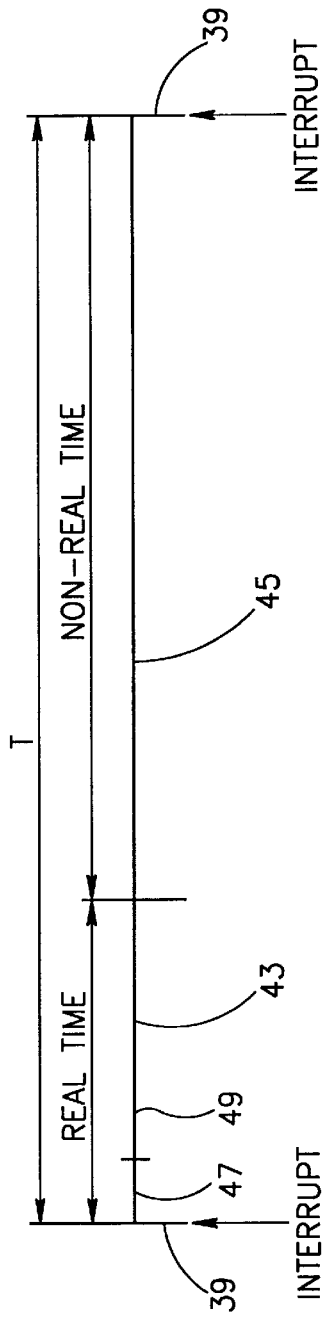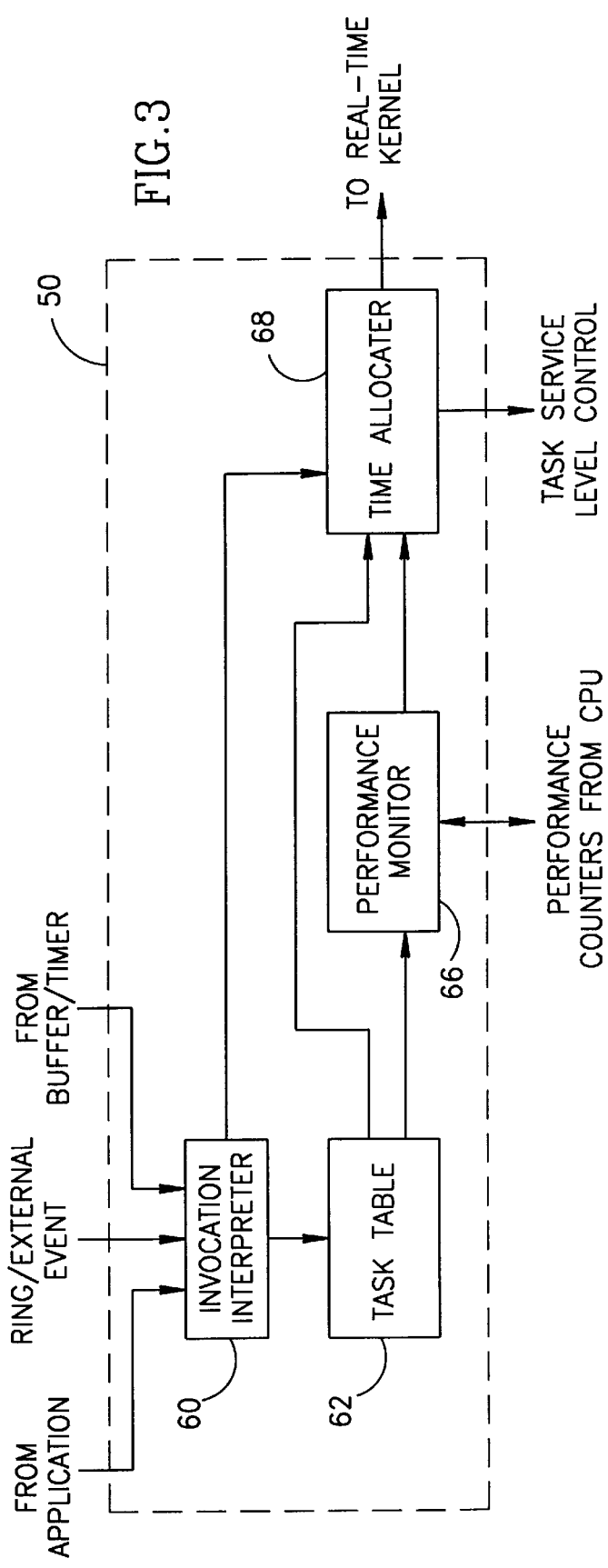

REAL-TIME TASK MANAGER FOR A PERSONAL COMPUTER

FIELD OF THE INVENTION

The present invention relates to real-time managers for personal computers in general.

BACKGROUND OF THE INVENTION

In traditional personal computer (PC) tasks, such as word processing, a quick response is valuable but not critical. Furthermore, the data produced is maintained on the hard disk of the PC, within the enclosed PC system.

However, some PC applications, such as facsimile, modem, audio, and video, require interfacing with the external world. This interface usually involves translation of external analog signals to/from a digital signal which the PC can process. The interface also requires a "real time response", such as processing of a certain amount of data within a given amount of time (e.g.: input of a video 30 frames per second requires processing a frame every 33 msec).

The current state of the art solutions for the above real-time applications employ dedicated processors, known as "Digital Signal Processors" (DSP), which are provided on add-in cards ("PC boards"). These processors are specifically adapted to the above real time tasks. They are also dedicated to a specific task, and are not used for any other purpose.

The host processor (or CPU), mainly an x86 processor manufactured by Intel Corporation of the USA, are the heart of the PC. Until recently, however, they did not possess enough power to execute real time, DSP tasks. New CPU's, such as the PENTIUM, also manufactured by Intel, have enough processing power to deal with such tasks.

Progress in the PC platform has been made not only with the processing power of the CPU. The dominant operating systems in PCs today is Windows 3.1. This operating system cannot handle several processing tasks simultaneously. New operating systems, such as Win 95, from Microsoft, and OS/2, manufactured by IBM of the U.S.A., will be capable of handling multiple tasks.

The progress which was and is still being made in the PC platform will enable a new technique of processing real time tasks on the host PC operating system (as opposed to on the add-in PC boards) to control the real time tasks. This is known as "Native" or "Host" Signal Processing. As mentioned in the article, "Intel Beats NSP Drum", by Martin Gold, CMP Publications Inc. 1995, real time kernels (such as SPOX of Spectron Microsystems Inc. of California, U.S.A.) can be employed under the host PC operating system to control the real time tasks. Such kernels allow creating and deleting DSP tasks, assigning priority to them and assigning events caused by the presence of the task. It does not provide a decision mechanism as to when to activate and how to operate such real-time tasks.

However, personal computers also have to perform user-oriented non-real-time tasks, such as word processing and spreadsheet calculations, within a reasonable amount of time, while performing at least one real-time task. The multiple tasks which can be operating (the real-time ones and the non-real-time ones) have to be coordinated and the processing power of the host CPU has to be spread among the many tasks. Furthermore, the load is not consistent; at times, the load on the host CPU is very great and at other times, it is light, 6 depending on the activity of the real-time tasks and of the user vis-a-vis the non-real-time tasks. It is possible that, at times, the host CPU will be unable to simultaneously perform all of the jobs requested of it or the performance of the traditional tasks will degrade significantly in the presence of the simultaneously operating real-time tasks.

SUMMARY OF THE PRESENT INVENTION

It is therefore an object of the present invention to provide a system and method which provides the general purpose, host CPU with the capability to perform multiple tasks and to "gracefully" change the service level of the real-time operations, such as modem, video and/or audio tasks, whenever the load on the host CPU is too high.

The term "graceful change" means maintaining the real-time operation (or task) but at a lower service level. For example, if the real-time operation is a facsimile transfer, the rate at which bits are transferred may be reduced. If the real-time operation is the playback of an audio signal, it may gracefully degrade from 44 KHz stereo to 22 KHz stereo to 22 Khz mono playback.

The present invention monitors the available CPU power and dynamically determines how to allocate between real-time and non-real-time tasks. It allocates the time among the currently active real-time tasks and determines the level of service each real-time task should have for the current time period.

In accordance with a preferred embodiment of the present invention, the real-time manager includes at least one real-time kernel and a task service manager. The real-time kernel activates and controls the real-time tasks. The task service manager allocates time between the real-time tasks and the other tasks, selects the service levels of the real-time tasks in response to the activity levels of the other tasks, and invokes the real-time kernel to activate and control the real-time tasks at the selected service levels.

Additionally, in accordance with a preferred embodiment of the present invention, the task service manager includes a task requirement unit and a time allocater. The task requirement unit determines expected task runtime requirements for the currently active real-time and other tasks. The time allocater changes the service level of at least one of the currently active real-time tasks if the activity level of at least one of the other tasks has changed significantly and allocates time among the currently active real-time and other tasks.

Moreover, in accordance with a preferred embodiment of the present invention, the task requirement unit includes a performance monitor which monitors the useful loading of the central processing unit (CPU) of the personal computer with respect to the activity level of all of the tasks and determines the amount of processing time available for the real-time tasks. The task requirement unit also has a real-time task lookup table which lists at least the length of time required for each real-time task at each service level so that the task requirement unit can determine the appropriate service level given the available time.

Further, in accordance with a preferred embodiment of the present invention, the performance monitor includes performance counters which measure the activity levels of the tasks. For example, the performance counters measure the number of data writes and floating point operations and the amount of bus activity during a predetermined length of time. The performance monitor also includes a unit which compares the values of the performance counters with previously determined values which indicate idle activity. The performance monitor can additionally include a unit which detects a nested interrupt of the task service manager by an operating system of the personal computer. The time allocater allocates more time to tasks interrupted by a nested interrupt.

Moreover, in accordance with a preferred embodiment of the present invention, one of the real-time tasks is a modem task and, for this case, the performance monitor includes a unit for monitoring data transfer over a modem. The time allocater includes a unit for reducing the service level of the modem task when there is no data transfer.

In one embodiment of the present invention, at least one of the real-time tasks is an audio task which samples and plays an audio signal. For this embodiment, the time allocater includes a sampling rate changing unit which changes the sampling rate of the audio task, thereby to change the service level of the audio task.

In a second embodiment of the present invention, at least one of the real-time tasks is a video task which samples and plays a video signal. For this embodiment, the time allocater includes a frame rate changing unit which changes the frame rate of the video signal, thereby to change the service level of the video task.

In a third embodiment of the present invention, at least one of the real-time tasks is a receiving modem task communicating with a sending modem. As is standard, the sending modem and receiving modem task utilize a symbol constellation. For this embodiment, the time allocater can include one or both of a constellation changing unit and a processing level changing unit. The constellation changing unit requests that, in the presence of clean communication lines, the sending modem change the constellation. This reduces the service level. In addition to changing constellations, the processing level changing unit can change the processing quality of the receiving modem task in response at least to the change of the constellation of the sending modem. This further reduces the service level. In another embodiment, the processing level changing unit which changes the processing quality of the receiving modem task when the performance monitor expects a CPU overloading for a short period of time in order to temporarily change the service level of the communication therebetween. In a further embodiment, the time allocater includes momentary degradation means for momentarily not accepting data sent by the sending modem, thereby requiring the sending modem to retransmit the data.

Additionally, in accordance with a preferred embodiment of the present invention, the real-time manager additionally includes an adjustable-sized buffer into which data received from real-time devices during a predetermined length of time are placed to be processed later by the real-time tasks associated with the real-time devices. The buffer size is adjusted when the time allocater changes the service level of a currently active task (which causes the amount of data to be received during the predetermined length of time to change).

The task service manager, in accordance with a preferred embodiment of the present invention, is typically invoked by an interrupt. The interrupt is typically produced by an external event, a timer or an application requesting the operation of one of the real-time devices. Alternatively or in addition, the interrupt can be produced when the adjustable-sized buffer is full.

The present invention incorporates a modem which changes the processing service levels, as described hereinabove. The present invention also incorporates the method implemented by the real-time manager, as described hereinabove.

One method implemented by the present invention involves the steps of a) monitoring activities of the computer to determine the useful loading of the central processing unit (CPU) of the personal computer with respect to the activity level of all of the tasks, b) determining the amount of time available for the real-time tasks, c) selecting the service levels of the currently active real-time tasks in accordance with the amount of time available and d) adjusting the size of a buffer into which data received from the real-time devices during a predetermined length of time are placed to be processed later by the real-time tasks associated with the at least one real-time device thereby to match the size of the buffer with the amount of processing time allocated to the currently active real-time tasks. The activities to be monitored are at least one of: i) performance counters which determine the activity level of the computer, ii) a nested interrupt by an operating system of the personal computer and iii) for modem tasks, the presence or absence of data transfers.

BRIEF DESCRIPTION OF THE DRAWINGS

The present invention will be understood and appreciated more fully from the following detailed description taken in conjunction with the drawings in which:

FIG. 2 is a timing diagram of operations of the personal computer system of FIG. 1;

FIG. 3 is a block diagram illustration of elements of a task service manager forming part of the system of FIG. 1;

DETAILED DESCRIPTION OF THE PRESENT INVENTION

Figure 1A:
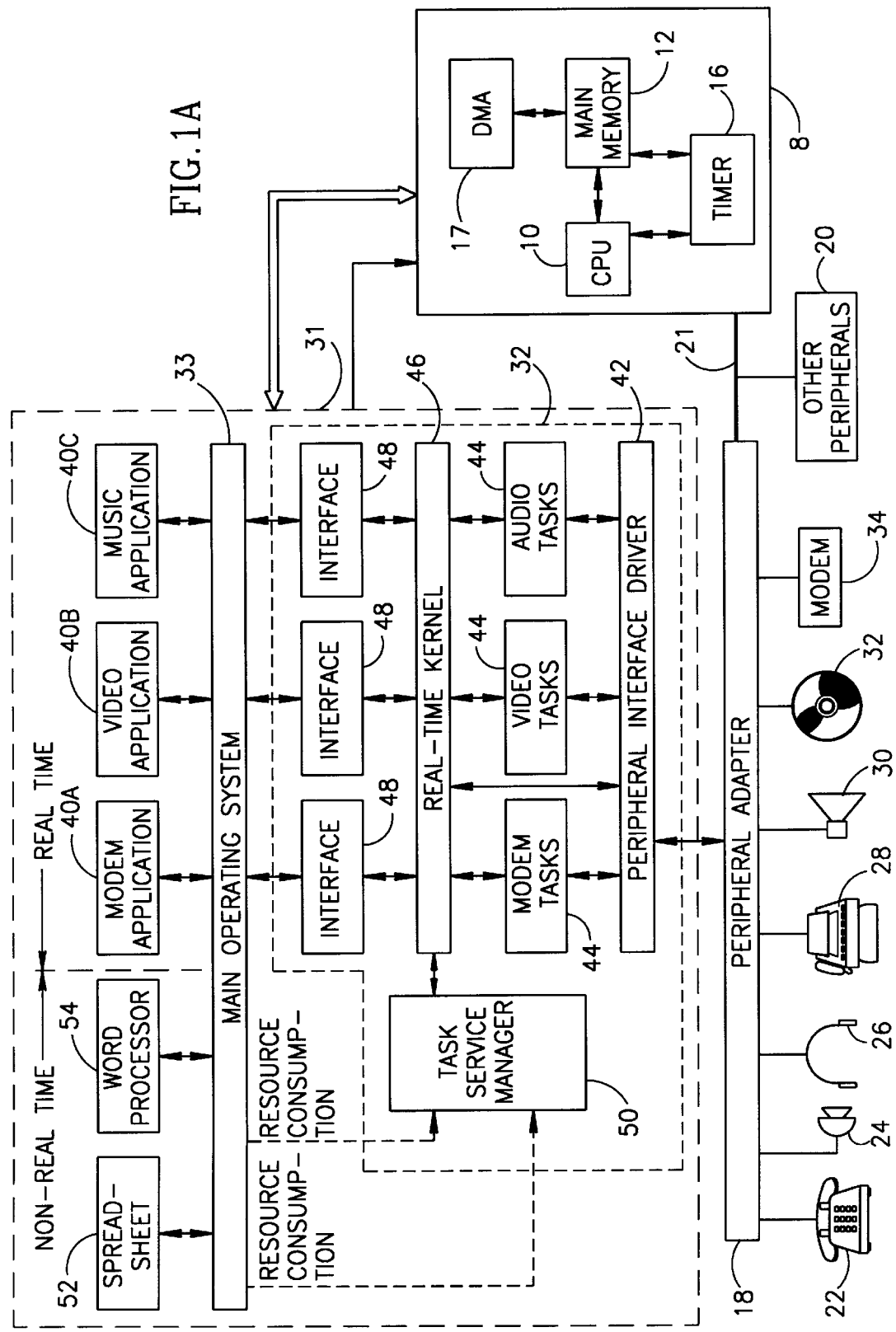
FIG. 1A is a block diagram illustration of a gracefully changing real- and non-real-time controlling personal computer system, constructed and operative in accordance with a preferred embodiment of the present invention.
Figure 1B:
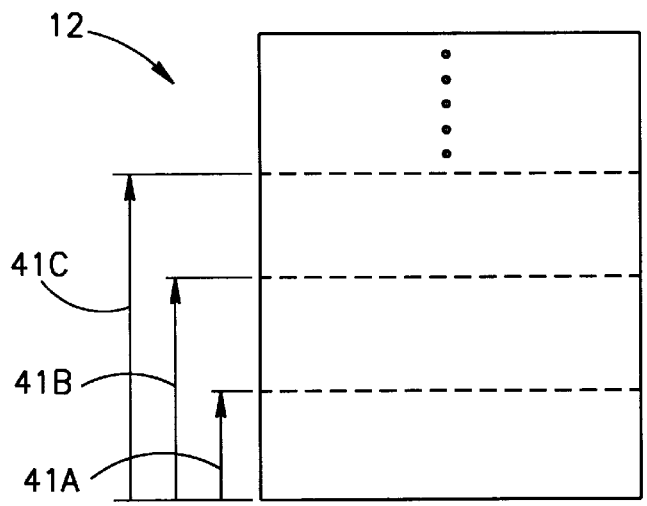
FIG. 1B is a schematic illustration of the organization of the main memory of the system of FIG. 1A into buffers.

Reference is now made to FIGS. 1A and 1B which illustrate a personal computer system which gracefully changes real-time operations in the presence of non-real-time operations, constructed and operative in accordance with a preferred embodiment of the present invention. It will be appreciated that, for the present discussion, the term "non-real-time task" indicates either a non-real-time task or any real-time task not being controlled by the real-time manager of the present invention.

The system comprises a computer system 8, formed of a central processing unit (CPU) 10, a main memory 12, a timer 16, a direct memory access (DMA) unit 17 and a real-time peripheral adapter 18. The system can also include other, non-real-time peripherals 20. The peripherals 18 and 20 are connected to a local bus 21 to which the CPU 10 and main memory 12 are connected.

The CPU 10 is one whose speed enables it to perform at least some real-time operations, for example, a 80486 or a PENTIUM CPU, both manufactured by Intel Corporation. The local bus 21 can, for example, be a personal computer interface (PCI) bus.

The real-time peripheral adapter 18 is a PC card or subsystem which has connections for a multiplicity of real-time devices, such as a telephone 22, a microphone 24, a headset 26, a computer facsimile machine 28, a speaker 30, a CD-ROM 32 and a modem 34. The adapter 18 provides an interface to the multiple real-time devices, converting their analog signals to and from the digital ones required by the CPU 10 and providing the digital signals to the main memory 12 for real-time processing by CPU 10. Typically the DMA 17 transfers the data into separate buffers within main memory 12, as described hereinbelow with respect to FIG. 1B. The adapter 18 also provides some signal processing and buffering, as described hereinbelow.

The block labeled 31 illustrates the operations performed by the computer system 8. As in the prior art, a main operating system 33, such as WINDOWS 3.1 or DOS, both manufactured by Microsoft Corporation of the USA, controls the operations of the entire system and specifically, of the non-real-time applications. Such non-real-time operations include word processing 54, spreadsheet calculations 52, some games, etc.

In accordance with the present invention, the main operating system 33 operates in conjunction with a gracefully changing real-time controller 32 which controls the operations of the real-time devices connected to the peripheral adapter 18 and provides their input to the main operating system 33. Operating system 33 then provides the data to the applications 40 operating in conjunction with the relevant real-time devices 22–34.

Controller 32 enables the CPU 10 to perform real-time operations while non-real-time operations occur, while minimally affecting the speed at which the non-real-time operations occur. For example, assume that the computer user wants to write a letter, in his word processor, while receiving a facsimile message and an electronic mail message as background operations. The facsimile and electronic mail messages are received via the computer facsimile machine 28 and the modem 34, respectively, both of which require real-time responses. The word processing operation, however, does not require real-time operation though it does require a reasonable response time (e.g. it must respond at least as fast as the user can type). CPU 10 is fast enough that, most of the time, the operations can occur simultaneously without interfering with each other. However, there are periods, whether long or short, when all three operations will require the full processing power of the CPU 10, at which point, the CPU 10 will work slowly on all operations. This is particularly annoying to the user, who expects the word processor to respond within a reasonable amount of time and it can be disastrous to the real-time operations of the facsimile and modem who must respond within predetermined, short periods of time or else they will be disconnected.

Therefore, in accordance with a preferred embodiment of the present invention, in the presence of overuse of the CPU 10, the controller 32 gracefully changes the operations of the currently active real-time devices. As described hereinabove, the term "graceful change" means maintaining the real-time operations but at a lower quality. For example, if the real-time operation is a facsimile transfer, the rate at which bits are transferred may be reduced. If the real-time operation is the playback of an audio signal, it may gracefully degrade from 44 KHz stereo to 22 KHz stereo to 22 KHz mono playback.

However, the speed of the application which interfaces with the user, which typically is a non-real-time operation, will be minimally reduced. Instead, the speed of the background operations, which are the real-time operations, will be reduced.

FIG. 1A illustrates the layers of operation of controller 32, beginning with its interface with the peripheral adapter 18 through to its interface with the various real-time applications, labeled 40a, 40b and 40c. FIG. 1B illustrates the adjustable sized main memory 12 having buffers 41a, 41b, 41c, of different sizes.

Controller 32 (FIG. 1A) comprises a peripheral interface driver 42, various tasks 44 for processing different types of real-time data, such as modem, video and audio data, a real-time kernel 46, interfaces 48 to the real-time applications 40 and a task service manager 50 for controlling the operation of the other elements in controller 32. The buffer 41 is an adjustable sized buffer into which all data is placed. The size of the buffer is a function of the number of active tasks and the amount of data each task receives, or can receive, during a given period of time, such as one second. As discussed hereinbelow in more detail, the amount of data to be received is, for some tasks, a function of the service level at which the task is operating.

For example, the modem receives 2400 symbols per second irrespective of the service level, as described hereinbelow. Thus, the buffer 41 needs to be 2400 bits large if only the modem is operating. If, at the same time, the audio unit is operating at 44 KHz, then the buffer 41 has to increase in size by an additional 176 Kilobits. In FIG. 1B, buffer 41a is operative for a single active task, buffer 41b is operative for two active tasks and buffer 41c is operative for three active tasks.

Driver 42 controls the operation of the peripheral adapter 18, indicating to it when to transfer digitized data to and from the buffer 41 of the main memory 12 and to and from the various real-time devices to which the adapter 18 is connected. Driver 42 enables data transfer into buffer 41 until it is full; once the entire buffer 41 is full, the DMA 17 produces an interrupt.

The various tasks 44 process the digitized data as required (i.e. fax data is processed differently than audio data, etc.), such as demodulating/modulating, filtering and/or compressing/decompressing. The tasks 44 also perform any handshaking operations required by the devices which are sending the data. In effect, tasks 44 perform the operations typically performed by the real-time cards of the prior art; however, in the present invention, tasks 44 are implemented within the CPU 10. The book, *The Theory and Practice of Modem Design*, by John Bingham, describes the operations which a modem task performs and is incorporated herein by reference.

The real-time kernel 46 can be any suitable real-time kernel or scheduler which can operate with a personal computer CPU 10. For example, the IA-SPOX kernel, commercially available from Spectron MicroSystems Inc. of Goleta, Calif., USA, is suitable Kernel 46 allows creation and/or invocation of real-time tasks, and of timing, external and internal events. The system 46 also assigns priorities and events to tasks and will supervise the execution of real-time tasks based on the attributes (list order, priority, events) assigned to each task. Each event is defined as either a packet of data which the real-time device has to process or an invocation operation. Each task is defined as the processing of packets of data, within the time constraints, for one of the real-time devices. Finally, kernel 46 provides the processed data from the tasks 44 to the applications 40, via interfaces 48.

Task service manager 50 manages the operations of the kernel 46, the tasks 44 and the driver 42 so that the real-time applications can generally smoothly operate with the non-real-time, user applications. In the WINDOWS environment, unit 50 is a virtual driver (VxD) which is invoked by a "buffer full" interrupt, by the timer 16, by an external event interrupt, such as a telephone ring, or by an application 40.

As described in more detail hereinbelow with respect to FIG. 3, unit 50 receives information regarding the resource consumption of each of the user applications, such as spreadsheet 52 and word processor 54, from the main operating system 33 and utilizes expected resource consumption information to determine the resource requirements of the currently active real-time operations. From this information, unit 50 determines how to allocate time to the various applications during a predetermined time period, where the user applications receive priority.

FIG. 2, to which reference is now briefly made, illustrates the sharing of the resources for a predetermined time period T. The time period T begins with an interrupt 39 at which point real-time controller 32 receives control from the operating system 33. Real-time controller 32 operates during the first portion 43 of the time period T, returning control to the operating system 33 at the end of portion 43. Operating system 33 then controls the operation of the computer system 8 (portion 45) until receipt of a further interrupt 39.

The length of the period T is determined such that a) the number of interrupts will be minimized and b) the latency requirements of the expected tasks are satisfied. Once T is set, the size of the required buffers of the various tasks are fixed per service layer, thereby fixing the length of portion 43 for the various combinations of active tasks.

The length of portion 43 is, as mentioned before, determined by unit 50 based on the current need for resources. During portion 43, unit 50 controls the approximate timing of the various real-time operations (see portions 47 and 49).

Unit 50 is invoked by predetermined types of external events, such as a telephone ring, or by one of applications 40 when it begins to require real-time activity. Unit 50 can also be invoked periodically by timer 16 or, when buffer 41 becomes full. All of these events can produce interrupts 39.

The amount of data within buffer 41 has to be processed during each portion 43. Therefore, the size of buffer 41 is adjustably selected to correspond, approximately, with the amount of data which can be processed during the current expected length of portion 43. Typically, though not necessarily, the more tasks that are currently active, the larger the buffer is.

Unit 50 allocates the resources of CPU 10 by assigning tasks to different slots, such as time slots 47 and 49, in conjunction with the real-time kernel 46. The assignment of time slots is based on the type of operation requiring the resources of CPU 10 and the expected resource requirements for that operation. As discussed herein, unit 50 changes the operations of the real-time devices as a function of the resource requirements of the user applications. The service level change commands are provided directly to the relevant task 44 which, in response, reduces the service level of the operation performed. When fewer resources are required, unit 50 commands the relevant tasks 44 to increase the level of the operation performed, where the ordering of the levels is in accordance with how much data must be processed during a given length of time.

Reference is now to FIG. 3 which illustrates the elements of the task service manager 50. Unit 50 typically comprises an invocation interpreter 60, a task table 62, a performance monitor 66 and a time allocater 68.

Invocation interpreter 60 receives invocation events, determines whether they come from an application 40, an interrupt 39, the buffer 41, or timer 16, as shown in FIG. 3, and determines the proper response in accordance with the type of event received. Invocation interpreter 60 also determines to which task 44 each event belongs and what type of event they represent. For example, an event could be data to be processed, handshake data, or initial communication data. Unit 50 responds differently depending on the type of the event.

Task table 62 stores a list of all potential real-time tasks which the personal computer might perform. This list is based on the type of real-time devices currently connected to the peripheral adapter 18. For each potential task, table 62 lists the type of event(s) which invoke the task, an estimated required runtime for the task at a plurality of service levels and the size of the buffer required for each service level. For example, the levels might be for full, medium and low performance. The tasks can also be listed as a function of the type of CPU.

The performance monitor 66 utilizes performance counters, such as are part of the PENTIUM CPU, which monitor the operation of the CPU and count the occurrence of a predetermined set of events. These performance counters are typically used for code optimization, as discussed in the article "Pentium Secrets" by Terje Mathisen and published in *Byte* Magazine, Jul. 1994, pp. 191–192. The article is incorporated herein by reference.

For the present invention, the performance counters are utilized to indicate the useful loading of the CPU 10, where the term "useful" indicates that the CPU 10 is busy processing or transferring data and not just running in a loop waiting for events to happen. For example, the performance monitor 66 can monitor performance counters which count data writes and bus activity, both of which indicate significant activity of the CPU. The performance monitor 66 can also monitor the number of multimedia (MMX) instructions of Intel currently implemented in the PENTIUM and PENTIUM Pro microprocessors.

For example, the performance monitor 66 can determine the value of the following function for performance Perf:

$$Perf = \sqrt{\left(\frac{measured\ data\ write}{idle\ data\ write}\right)^2 + \left(\frac{measured\ bus\ activity}{idle\ bus\ activity}\right)^2 + \left(\frac{measured\ FP\ instructions}{idle\ FP\ instructions}\right)^2} \quad (1)$$

where "measured data writes", "measured bus activity" and "measured FP (floating point) instructions" are the outputs of the counters and "idle data writes", "idle bus activity" and "idle FP instructions" are normalizing values based on the activity of the CPU when no tasks are occurring (i.e. during their idle time).

The monitor 66 reads the values of the counters and resets them as necessary. Based on the values of the counters, the monitor 66 determines, via equation 1, the percentage of effective time which the CPU 10 needs to spend on user applications with the remaining time to be spent on real-time operations.

Monitor 66 also maintains a history of the values of the counters. By analyzing their changing values and by knowing, from task table 62, the expected runtime for each task, monitor 66 can determine if there is an instantaneous peak in the load on the CPU 10 or if the current rate will be sustained for some time.

The performance monitor 66 also monitors the activity level of the modems. This is of particular concern since a modem might be activated but not busy transferring data. For example, although a user might be connected, via the modem, to a network, the user might be reviewing the data recently downloaded, preparing an Email message, etc. During this idle time, the modem is active but does not do anything useful for the user and thus, its activity level should be degraded. Therefore, the performance monitor 66 receives activity level information from the modem application 40A indicating when the modem is actively transferring data.

The time allocater 68 utilizes the output of the performance monitor 66 and task table 62 to approximately allocate the various tasks to time slots within a predefined time period, as described in more detail hereinbelow with respect to FIG. 7. In addition, unit 68 determines when a real-time device has to reduce (or increase) the level of its performance as a function of how active the user (i.e. non-real-time) applications currently are. This graceful changing of task service levels enables all tasks to continue operating under most CPU loading constraints.

Figure 4A:
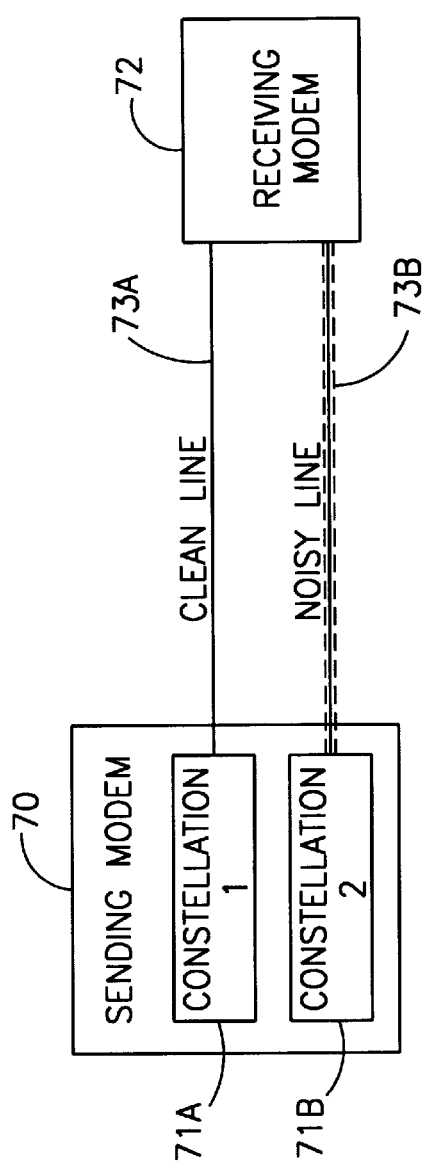
FIG. 4A is a block diagram of a prior art modem communication system.

Reference is now made to FIGS. 4A, 4B, 5A, 5B, 5C and 5D which provide one example of graceful service level reduction which is useful for modern communications. For all modem communications, there is a sending modem 70 and a receiving modem 72 which communicate along a data line 73. The sending modem 70 converts the binary data, which has bits having either a one or zero value, into symbols of a few bits each. The modem 70 then converts the digital symbol signal into an analog one having a modulated carrier signal. The carrier signal is at a given frequency and the modulation typically changes the phase and amplitude of the carrier signal in accordance with the values of the symbols being transmitted. The number of possible phase/amplitude combinations is dependent on the number of possible symbol values and is known as the constellation 71. FIG. 4A illustrates that the sending modem has two constellations 71a and 71b. The constellations shown can be part of the V.32 bis or V.34 standards.

Figure 5D:
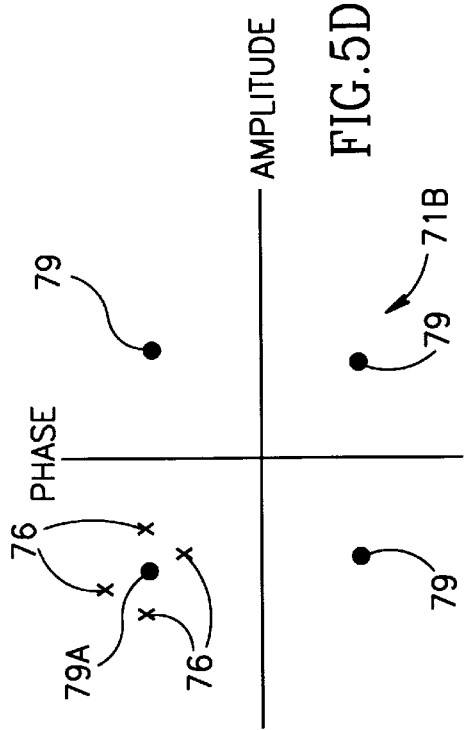
FIGS. 5A, 5B, 5C and 5D are graphical illustrations of modem bit constellations, useful in understanding the operations of the modems of FIGS. 4A and 4B.
Figure 5C:
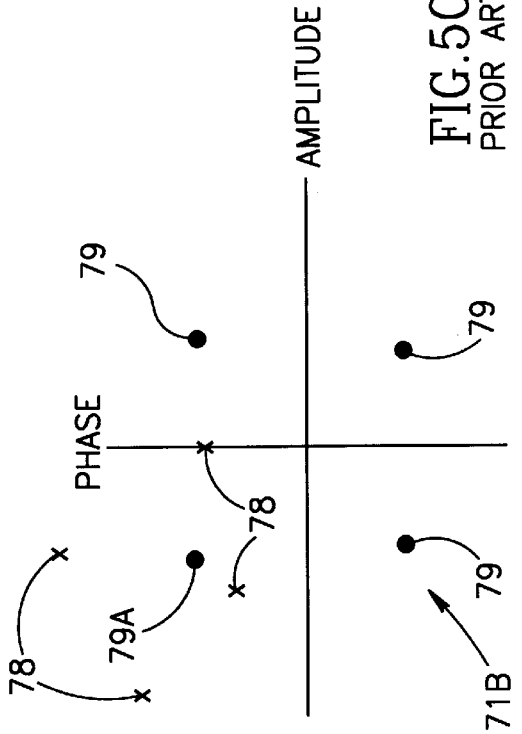
Figure 5A:
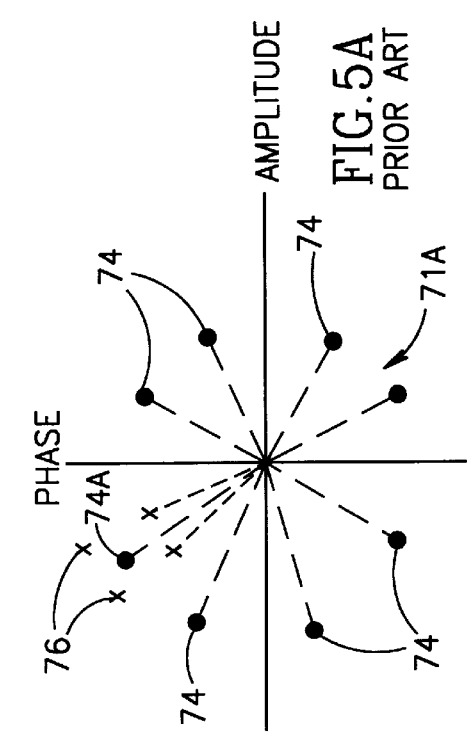

FIG. 5A illustrates the constellation 71a of amplitudes and phases possible for eight symbols on an amplitude-phase graph. Each point 74 corresponds to a different one of the eight possible symbol values. The points 74 are evenly spread throughout the graph and there are two points 74 per quadrant.

The receiving modem 72 typically receives the modulated signal imperfectly. Thus, it might receive data representing symbol value 74a as any one of the x's 76. The receiving modem 72 analyzes the x's 76 and determines that they are closest to the symbol value 74a and thus, receiving modem 72 converts the x's 76 to the symbol value represented by point 74a.

Figure 5B:
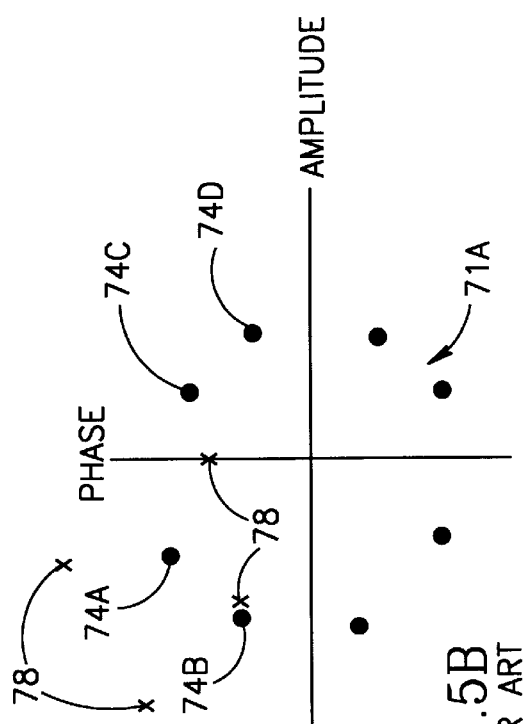

If the line 73 was noisy, as indicated by line 73b, the received symbol values representing symbol value 74a might fall anywhere within the graph. This is shown in FIG. 5B wherein the four received symbol values (x's 78) are located within the first and second quadrants. In this situation, the received symbol values 78 might be recognized as any one of the four symbol values 74a–74d. This is obviously incorrect. Therefore, in the prior art, the constellation is changed to constellation 71b, which has fewer symbol values, whenever the line 73 was noisy.

The result is shown in FIG. 5C. The constellation 71b has one symbol value (labeled 79) per quadrant, where the symbol values 79 are a subset of the symbol values 74 of FIGS. 5A and 5B. The four noisily received symbol values 78 are now close to symbol value 79a and thus, will be recognized as such. It will be appreciated that the amount of processing required to recognize the noisily received symbol values 78 is about the same as the amount of processing required to recognize the cleanly received symbol values 76.

Constellation 71b is of a reduced service level since only four symbol values can be recognized. Four symbols represent the possible combinations of only two bits whereas eight symbol values represent the possible combinations of three bits. Thus, when the constellation of FIG. 5C is operative, the bit rate (or rate at which bits are transmitted) is less.

Applicants have realized that, if the line is clean, the amount of processing required to recognize a symbol value within the reduced constellation 71b is less than that required to recognize a symbol value within the larger constellation 71a. If, as shown in FIG. 5D, constellation 71b, with only four symbol values 79, is utilized, since the line 73 is clean, the received symbol values 76 are tightly clustered around symbol value 79a. Furthermore, the other symbol values 79 are quite distant from symbol value 79a. Thus, the filters (e.g. echo cancelers, equalizers, etc.) which determine if symbol value 79a was sent or if it was another symbol value 79 do not need to be very accurate. Therefore, the filters and other processing elements needed to recognize received symbol values 76 as symbol value 79a can be less accurate than for constellation 71a and reduced accuracy typically means less processing time. However, the service level is lower since the resultant baud rate is low, even though the line is clean.

Specifically, the filters of a modem are typically finite impulse response (FIR) filters which have a plurality of "taps", or coefficients, which define the shape of the filter. The higher the accuracy of the filter, the more taps there are and the more processing power required to implement the filter.

Most of the digital filter formula's are of the kind:

$$y(n) = \sum_{i=0}^{N} a_i x(n-i) \quad (2)$$

where y(n) is the output signal, x(n) is the input signal, the $a_i$ are the coefficients or taps of the filter and N is the number of taps of the filter. The length N determines the accuracy of the filter. Normal filters are of length 100 and above. The coefficients $a_i$ are not constant and are typically recalculated periodically, based on the varying line conditions. The re-calculation process is typically lengthy.

There are three possible mechanisms for reducing the computation load of the modem, The length N of the filter can be reduced (thereby reducing the accuracy of the modem), the re-calculation of the coefficients can occur less frequently or the symbol rate can be reduced.

In accordance with a preferred embodiment of the present invention, whenever more time needs to be allocated to the user applications, time allocater 68 indicates to the modem task 44 to change to smaller constellation 71b. This is true even though the communication line 73 is not noisy.

Figure 4B:
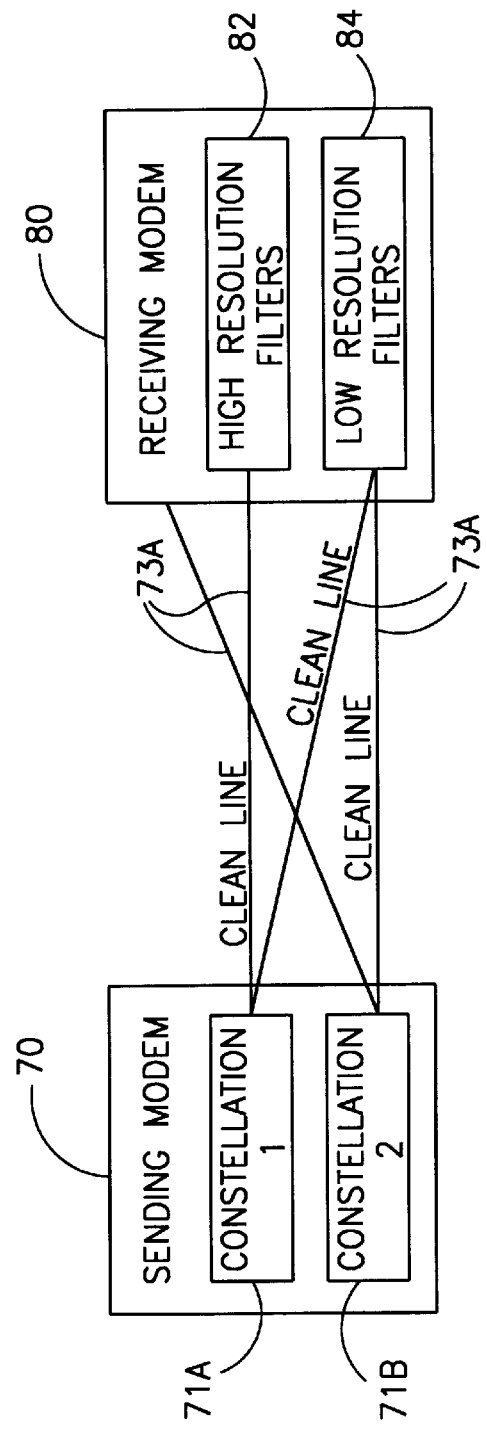
FIG. 4B is a block diagram of a gracefully changing modem communication system forming part of the system of FIG. 1.

FIG. 4B illustrates communication in accordance with the present invention. The present invention utilizes sending modem 70 with its modem processor, labeled receiving modem 80. Whenever the receiving modem 80 has enough processing capability, the two modems operate with constellation 71a and receiving modem 80 utilizes high resolution processing, labeled 82, with the full set of filter coefficients. When receiving modem 80 needs less processing capability, it indicates such to sending modem 80 which then switches to constellation 71b. Receiving modem 80, in turn, switches to low resolution processing, labeled 84, with a smaller set of filter coefficients.

FIG. 4B illustrates a further from of graceful reduction in modem service level useful whenever there are spikes in the amount of CPU processing time necessary. This involves operating low resolution filters 84 on constellation 71a. In this service level, the processing time will be reduced but the error rate will go up. Such a situation is acceptable only if it is present for a short time.

FIG. 4B illustrates a still further form of graceful reduction which reduces the symbol rate without changing the processing level. Thus, a further degradation occurs with constellation 71B is utilized with the high resolution filters 82. This reduces processing time although not as much as by utilizing low resolution filters 84.

A modem can also momentarily degrade the service level by not acknowledging receipt of data, thereby requiring the sending modem to retransmit the data. Some processing is required but far less than if the data was received. The result is a slower rate of data transfer and, accordingly, less computation per a given length of time.

Other types of graceful reduction in service level include: changing an audio signal from 44 KHz stereo to 22 KHz stereo to 22 KHz mono playback and changing the frame rate of a video signal. Both reductions affect the amount of data received at any one time, and thus, changing the service level requires changing the size of the buffer 41. It will be appreciated that modems transfer the same number, typically 2400 baud, of phase/amplitude combinations per second with all constellations. The constellation is what increases and decreases the resultant baud rate.

In addition, it will be appreciated that, for video signals compressed in accordance with the Motion Pictures Expert Group (MPEG) standard, the service level can be reduced by not compressing the images which come between two main frames (i.e. by transferring only every X frames). On the decompression side, the present invention can only decompress those frames, known as I frames, which are fully compressed.

Figure 6C:
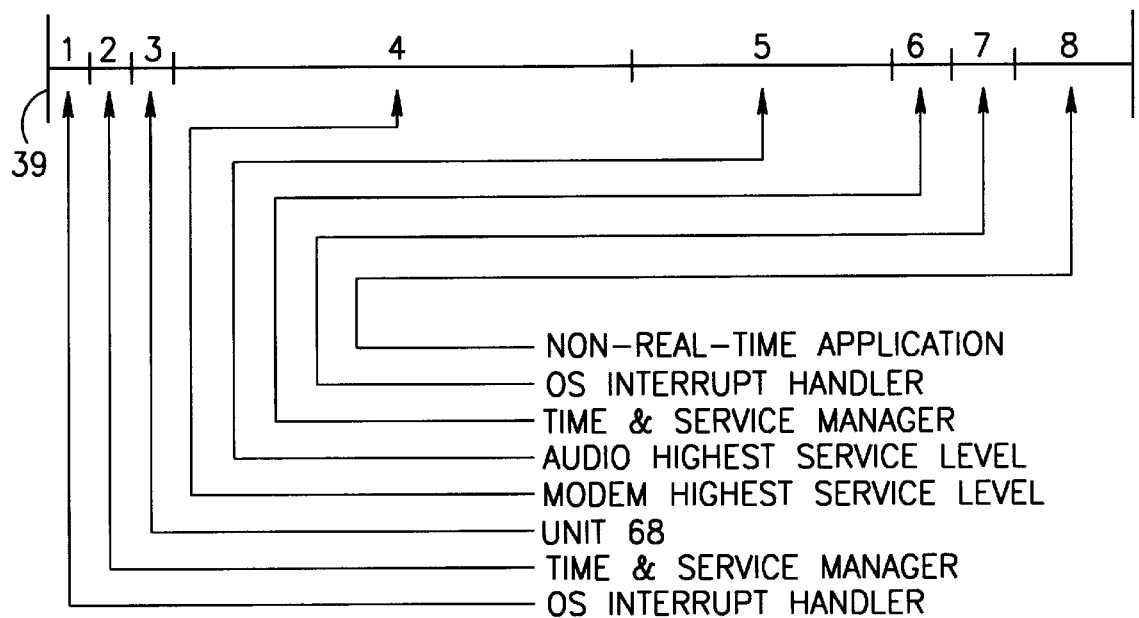
FIGS. 6A, 6B, 6C and 6D are timing diagrams of four possible scenarios of operation of the system of FIG. 1A.
Figure 6A:
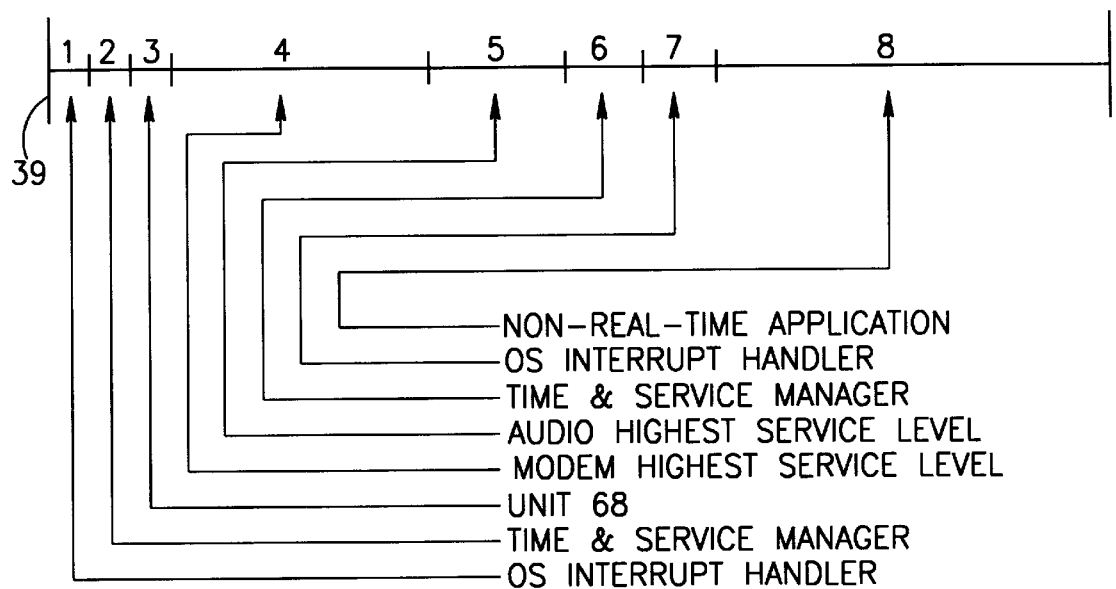
Figure 6B:
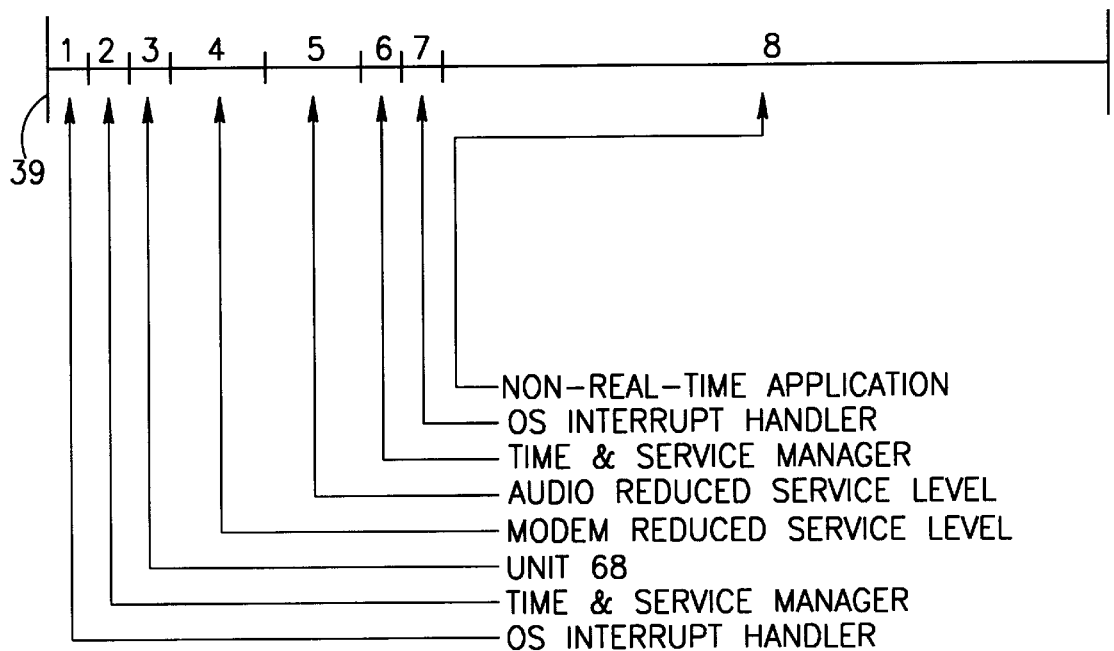
Figure 6D:
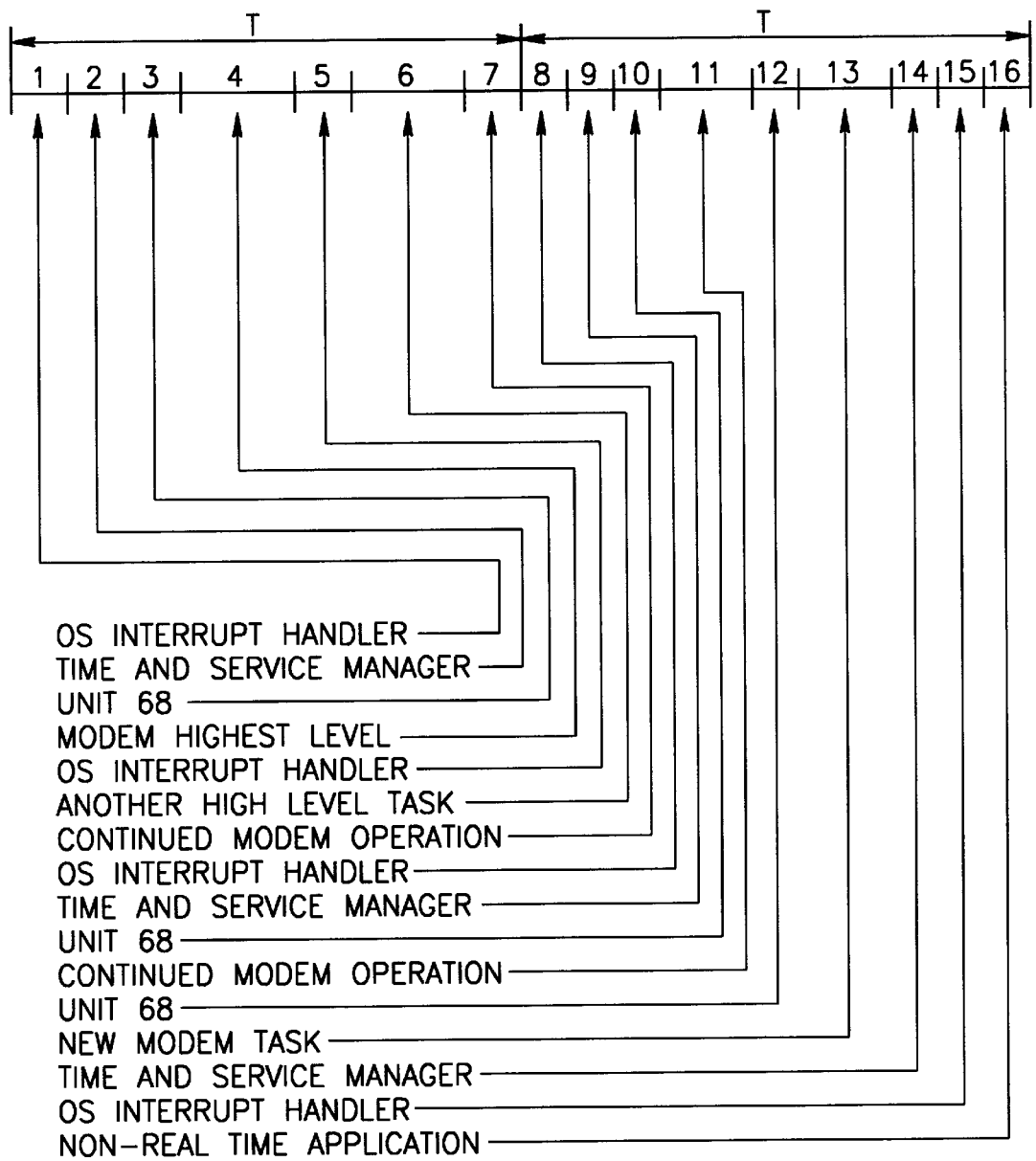
Figure 7:
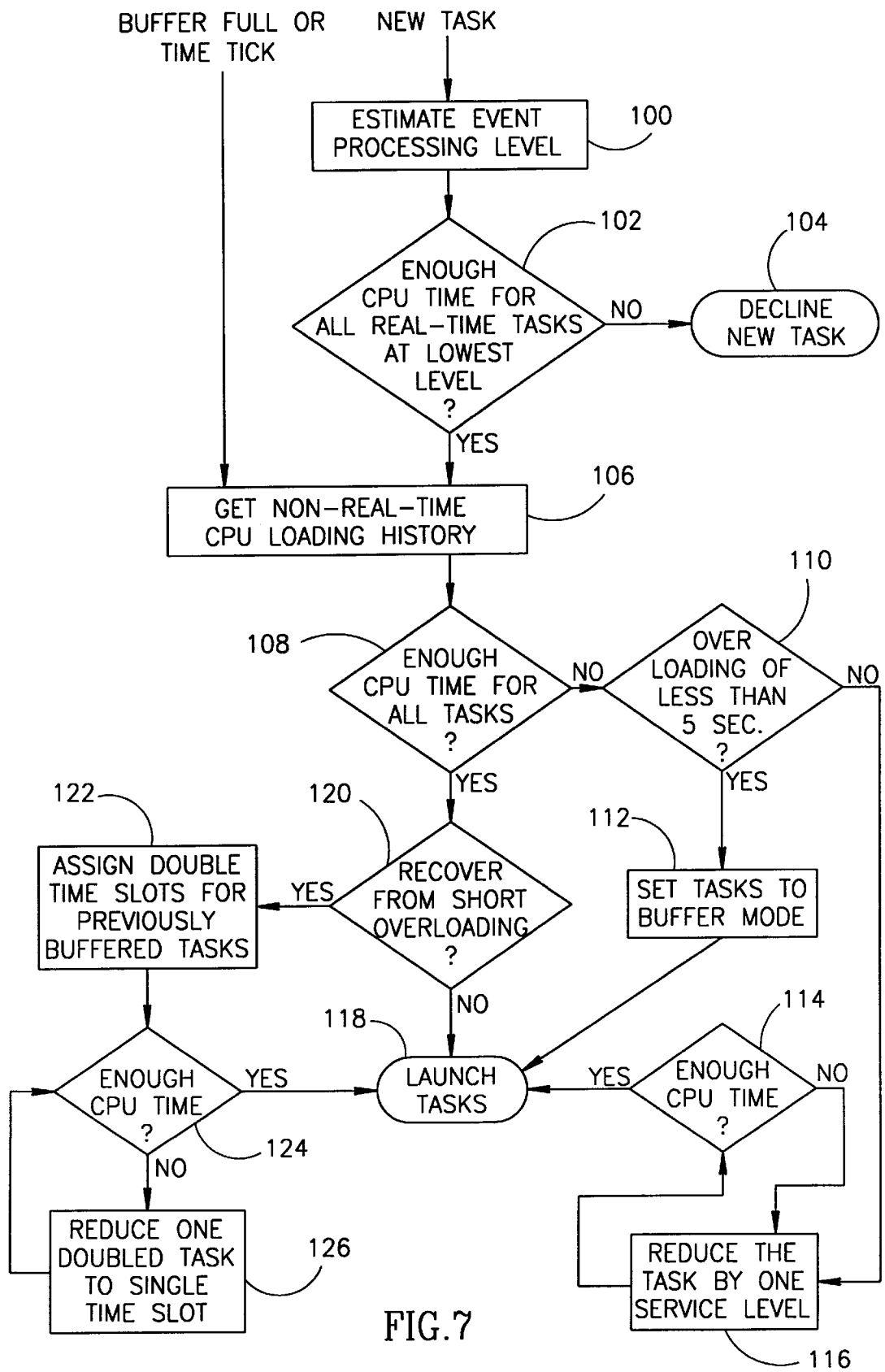
FIG. 7 is a flow chart illustration of operations of the manager of FIG. 3.

Reference is now made to FIGS. 6A, 6B, 6C and 6D which illustrate four different CPU loading situations and to FIG. 7 which illustrates the operations performed by time allocater 68 in response to the loading situations.

In FIG. 6A, the CPU 10 is not overloaded and time allocater 68 can run all real-time devices at their full service levels. The time period begins with the occurrence of an interrupt event 39, due, as described hereinabove, to the periodic operation of timer 16, to the buffer 41 being fill, to an external interrupting event, or to a real-time application 40. During time slot 1 the interrupt handler of the operating system 33 operates and, during time slot 2, the operating system provides control to the task service manager 50. During time slot 3, unit 50 determines the resource requirements for the current time period. Since the non-real-time task requires relatively little operating time, unit 50 estimates the length of time each of the real-time tasks will require to operate at their highest performance levels. At the beginning of time slot 4, unit 50 activates a modem application operating at the highest performance level and at the beginning of time slot 5, unit 50 activates an audio application, also at its highest performance level. Both real-time applications operate on the data stored in buffer 41. Once the buffers are empty, the applications return control to unit 50. While the non-real-time applications operate, the DMA 17 refills the emptied buffer 41.

During time slot 6, unit 50 finalizes its operations and provides control back to the operating system 33. Time slot 7 is utilized by the interrupt handler of the operating system 33 to close the operation of unit 50 and to activate any non-real-time tasks. For the example shown in FIG. 6A, the task performed is one which is somewhat computationally intensive, such as a spreadsheet operation.

FIG. 6B illustrates the time allocation when the non-real-time task is very computationally intensive such that the real-time tasks, at full performance level, cannot be implemented in the time available. For example, the word processor may be performing a spell-check while a facsimile is being received. In this situation, both applications require the resources of the CPU 10; however, the CPU 10 cannot comply.

In FIG. 6B, time slots 1–3 and 6 and 7 remain of the same length; however, time slot 8, for the non-real-time task, is much longer. Correspondingly, the time slots 5 and 6, allocated to the modem and audio tasks, are much smaller. In order for the modem and audio tasks to finish processing the data received, they both operate at lower performance levels, as described hereinabove.

Alternatively, if the performance history indicates that the overloading is expected to be short (e.g. less than two seconds), the task service manager 50 can implement a "buffered mode" in which the received data is pre-processed only and then stored in a separate, momentary, buffer implemented in main memory 12. Typically, there is one momentary buffer, of the length of two seconds of data at the current service level.

The pre-processing is necessary to ensure that no events which require an immediate response were received, and, if they were received, that the appropriate response is provided. For example, for a facsimile operation, an entire page can be buffered before the facsimile machine has to respond to the sending machine. As described in more detail hereinbelow with respect to FIGS. 6C and 7, the momentary buffer is cleared during periods of low, non-real-time activity.

FIG. 6C illustrates the time allocation when the non-real-time task is not computationally intensive and/or in response to a previous momentary buffering operation. As before, time slots 1–3 and 6 and 7 remain of the same length; however, time slot 8, for the non-real-time task, is much shorter. Correspondingly, the time slots 5 and 6, allocated to the modem and audio tasks, are twice as long as in FIG. 6B. Thus, during these long time slots, the modem and audio tasks can recover from having been in buffered modes.

FIG. 6D illustrates the time allocation if there is another task which interrupted the task service manager 50 and is now running at the highest CPU priority level. As a result, the task service manager 50 of the present invention does not run for as long as it anticipated, resulting in unprocessed data at the end of the time period T. The performance monitor 66 will detect this situation by the fact that a "nested" interrupt is present and the task allocater 68 will originally operate in the buffered mode. If the nested interrupt lasts for too long, the task allocater 68 will reduce the service levels of the active tasks, as necessary.

In FIG. 6D, time slots 1–3 remain the same length and invoke the applications to be processed. Time slot 4 is allocated to the modem at the highest level. However, in time slot 5, the modem activity is interrupted, by the interrupt handler of the operating system, for use with another high level task. Time slot 6, which wasn't allocated at all, is the time utilized by the other high level task. In time slot 7, the modem activity continues but does not process all of the data available to it. At the end of time slot 7, the time period T has ended.

Time slots 8–10 begin the next time period where the task allocater 68 attempts to clear out the remaining data. Thus, it allocates all of time slot 11 to modem processing. When that processing has finished, task allocater 68 operates again, in time slot 12, to determine what action to activate next. For example, it may be a new task for the modem. Time slot 13 is provided for this task. In time slot 14, time and service manager 50 finalizes its operations and provides control back to the operating system 33. Time slot 7 is utilized by the interrupt handler of the operating system 33 to close the operation of unit 50 and to activate any non-real-time tasks (in time slot 16).

FIG. 7 illustrates the operations performed to determine the time slot allocation of FIGS. 6A–6D. The operations begin when control is received from the interrupt handler of the operating system.

In step 100, which is performed when a new task is invoked, time allocater 68 receives the new task(s) and a list of the currently active real-time tasks from the invocation interpreter 60. Time allocater 68 then estimates how long each currently active, real-time event will take, based on the data in task table 62.

In step 102, the time allocater 68 determines if there is enough time available in a time period T to perform all of the currently active, real-time tasks at their lowest performance level. If not, time allocater 68 indicates to the user (step 104) that the new task(s) cannot be serviced. If so, the new task(s) are launched.

Step 106 is performed when a new time tick or buffer full interrupt is received, once the tasks have been launched. The time allocater 68 receives a list of the currently active non-real-time tasks, how active each one is and their performance history from the performance monitor 66.

In step 108, the time allocater 68 determines, from the data received from the task table 62 for the current real-time tasks and from the performance monitor 66, if there is enough time available in time period T to perform all the non-real-time and real-time tasks, with the real-time tasks at their highest performance levels and the non-real-time tasks at their normal or somewhat degraded levels. If not, time allocater 68 proceeds to step 110; otherwise, it proceeds to step 120.

In step 110, time allocater 68 determines the extent of the overloading. If the overloading is less than a predetermined amount of time, such as 5 seconds, time allocater 68 moves (step 112) all of the currently active, real-time tasks to the buffering mode and launches the tasks (step 118).

If, the overloading is more than 5 seconds, the time allocater 68 reduces (step 116) the service level of each of the currently active, real-time tasks. Time allocater 68 moves to step 114 to determine if, at the lower performance level, there is enough CPU time available. If so, the tasks are assigned their time slots and launched. Otherwise, either the service level is further reduced or the time allocater 68 indicates to the user that it cannot perform all desired tasks.

In step 120 (when there is enough CPU time to perform all tasks), the time allocater 68 determines if there is enough CPU time to enable the real-time tasks to recover from the buffering mode. If not, the time allocater 68 proceeds to step 118, maintaining the buffering mode if it is currently active.

If there is enough CPU time available, the time allocater 68 assigns (step 122) time slots of twice the previous length for those real-time tasks which were previously in the buffered mode. In step 124, the time allocater 68 determines whether, with the double length time slots, there is enough available CPU time. If so, time allocater 68 proceeds to step 118. Otherwise, time allocater 68 reduces (step 126) one of the double length time slots to a single length time slot and determines, once again (in step 124), if there is enough time available. If not, the process is repeated until there is enough time.

It will be appreciated by persons skilled in the art that the present invention is not limited to what has been particularly shown and described hereinabove. Rather the scope of the present invention is defined by the claims which follow:

I claim:

1. A real time task manager for a personal computer for managing the operation of real time tasks while the personal computer also performs other tasks, the real time manager comprising:
    at least one operating system for activating and controlling said real-time tasks; and
    a task service manager for allocating time between said real-time tasks and the other tasks, said task service manager including a processor programmed to:
        receive information as to the real-time tasks being performed at a first time interval;
        allocate a time to each of said real-time tasks being performed under operator control at said first time interval, said allocation including selecting the service levels of said operator controlled real-time tasks in response to said time allowance, and
        invoke the operating system to activate and control at least all of said operator controlled real-time tasks from said first time interval at the selected service levels, at a second time interval.

2. A manager according to claim 1 and wherein said processor is additionally programmed to:
    determine the expected task runtime requirements for the currently active real-time and other tasks; and
    change the service level of at least one of said currently active real-time tasks if the activity level of at least one of said other tasks has changed significantly and for allocating time among said currently active real-time and other tasks.

3. A manager according to claim 2, additionally comprising:
    a real-time task lookup table for listing at least the length of time required for each real-time task at each service level; and
    a performance monitor for monitoring the useful loading of the central processing unit (CPU) of said personal computer with respect to the activity level of all of the tasks, for determining the time available for the real-time tasks and for selecting the service level of each real-time task from said real-time task lookup table.

4. A manager according to claim 3 and wherein said performance monitor includes performance counters which measure the activity levels of the tasks.

5. A manager according to claim 4 and wherein said performance counters measure at least one parameter selected from the group comprising: the number of data writes and floating point operations, integer operations and the amount of bus activity during a predetermined length of time.

6. A manager according to claim 4 and wherein said performance monitor includes means for comparing the values of said performance counters with previously determined values indicating idle activity.

7. A manager according to claim 3 wherein said performance monitor includes means for detecting a nested interrupt of said task service manager by an operating system of said personal computer and wherein said time allocater includes means for allocating more time to tasks interrupted by a nested interrupt.

8. A manager according to claim 3, wherein said performance monitor includes means for monitoring data transfer over a modem and wherein said processor is additionally programmed to reduce the service level of said modem task when there is no data transfer.

9. A manager according to claim 2, additionally comprising:
    a modem for sending and receiving data, said modem adapted for utilizing a constellation, and including constellation changing means, operative in the presence of clean communication lines, for requesting that said modem change said constellation; and
    processing level changing means for changing the processing quality of said modem task by changing the constellation of the modem, in order to change the service level of the communication therebetween.

10. A manager according to claim 3, said time allocation including, changing the processing quality of said modem task when said performance monitor expects a CPU overloading for a short period of time in order to temporarily change the service level of the communication therebetween.

11. A real-time task manager for a personal computer for managing the operation of real-time tasks while the personal computer also performs other tasks, the real-time manager comprising:
    at least one real-time operating system for activating and controlling said real-time tasks;
    a task service manager for allocating time between said real-time tasks and the other tasks, for selecting the service levels of said real-time tasks in response to the activity levels of said other tasks, and for invoking the real-time operating system to activate and control said real-time tasks at the selected service levels; and
    a time allocator, said time allocator including momentary degradation means for momentarily not accepting data.

12. A real-time task manager for a personal computer for managing the operation of real-time tasks while the personal computer also performs other tasks, the real-time manager comprising:

at least one real-time operating system for activating and controlling said real-time tasks;

a task service manager for allocating time between said real-time tasks and the other tasks, for selecting the service levels of said real-time tasks in response to the activity levels of said other tasks, and for invoking the real-time operating system to activate and control said real-time tasks at the selected service levels; and a time allocator, said time allocator including frame rate changing means for changing the frame rate of a video signal, thereby to change the service level of a video task.

13. A real-time task manager for a personal computer for managing the operation of real-time tasks while the personal computer also performs other tasks, the real-time manager comprising:

at least one real-time operating system for activating and controlling said real-time tasks;

a task service manager for allocating time between said real-time tasks and the other tasks, for selecting the service levels of said real-time tasks in response to the activity levels of said other tasks, and for invoking the real-time operating system to activate and control said real-time tasks at the selected service levels, and is configured for operating in conjunction with at least one real-time device, and an adjustable-sized buffer into which data received from said at least one real-time during a predetermined length of time are placed to be processed later by the real-time tasks associated with said at least one real-time device.

14. A manager according to claim 2 adapted for operating in conjunction with at least one real-time device, and additionally comprises an adjustable-sized buffer into which data received from said real-time devices during a predetermined length of time are placed to be processed later by the real-time tasks associated with said at least one real-time device, wherein said adjustable-sized buffer includes a buffer size changer for adjusting the size of said buffer when said time allocater changes the service level of a currently active task such that said adjustable-sized buffer holds data from said currently active tasks, at their current service levels, received during said predetermined length of time.

15. A manager according to claim 1, wherein said processor includes a handler for responding to at least one of the events from the group comprising: an external event, a timer and an application requesting the operation of one of said real-time devices.

16. A manager according to claims 13 and also comprising means for invoking said task service manager which is activated at least when said adjustable-sized buffer is full.

17. A manager according to claim 3 which operates in conjunction with at least one real-time device, and additionally comprises:

an adjustable-sized buffer into which data received from said real-time devices during a predetermined length of time are placed to be processed later by the real-time tasks associated with said at least one real-time device; and a momentary buffer into which data from said adjustable-sized buffer are placed, after pre-processing by said task service manager, when said performance monitor expects a CPU overloading for a short period of time.

18. A method for managing the operation of real-time tasks of a personal computer while the personal computer performs other tasks, the method comprising the steps of:

monitoring the CPU at a first time to determine the real-time tasks being performed at said first time;

allocating time between said real time tasks being performed at said predetermined time;

selecting the service levels of said real-time tasks in response to the activity levels of said other tasks; and invoking a real time operating system to activate and control said real time tasks at the selected service levels at a second time.

19. A method according to claim 18 and wherein said step of allocating time includes the steps of:

monitoring the useful loading of the central processing unit (CPU) of said personal computer with respect to the activity level of all of the tasks;

determining the amount of time available for the real-time tasks; and selecting the service levels of the currently active real-time tasks in accordance with the amount of time available.

20. A method according to claim 19 and wherein said second step of selecting includes the step of comparing the values of performance counters which monitor the activity level of the CPU with previously determined values.

21. A method for managing the operation of real-time tasks of a personal computer while the personal computer also performs other tasks, the method comprising the steps of:

allocating time between said real-time tasks and said other tasks; and selecting the service levels of said real-time tasks in response to the activity levels of said other tasks;

wherein when at least one of said real-time tasks is a modem task utilizing a constellation, said selecting step includes, requesting that, in the presence of clean communication lines, said modem change said constellation.

22. A method according to claim 21 and wherein said first step of selecting additionally includes the step of:

changing the processing quality of said receiving modem task in response at least to the change of the constellation of the sending modem, in order to change the service level of the communication therebetween.

23. A method according to claim 19 and wherein at least one of said real-time tasks is a receiving modem task communicating with a sending modem, said sending modem and receiving modem task utilizing a constellation, and wherein said first step of selecting includes the steps of:

changing the processing quality of said receiving modem task when said step of monitoring indicates a CPU overloading for a short period of time in order to temporarily change the service level of the communication.

24. A method for managing the operation of real-time tasks of a personal computer while the personal computer also performs other tasks, the method comprising the steps of:

allocating time between said real-time tasks and said other tasks; and selecting the service levels of said real-time tasks in response to the activity levels of said other tasks;

wherein when at least one of said real-time tasks is a modem task and said selecting step includes, momentarily not accepting data, thereby requiring a sending modem to retransmit the requisite data.

25. A method for managing the operation of real-time tasks of a personal computer while the personal computer also performs other tasks, the method comprising the steps of:

allocating time between said real-time tasks and said other tasks; and selecting the service levels of said real-time tasks in response to the activity levels of said other tasks;

wherein when at least one of said real-time tasks is an audio task which samples and plays an audio signal and said selecting step includes, changing the sampling rate of said audio task, thereby to change the service level of said audio task.

26. A method according to claim 19 and wherein at least one of said real-time tasks is a video task which samples and plays a video signal and wherein said first step of selecting includes the step of changing the frame rate of said video signal, thereby to change the service level of the video task.

27. A method according to claim 19 and wherein said first step of selecting includes the step of adjusting the size of a buffer when the service level of a currently active task is changed such that said buffer holds data from said currently active tasks, at their current service levels, received during a predetermined length of time.

28. A method for managing the operation of real-time tasks performed by real-time devices of a personal computer while the personal computer also performs other tasks, the method comprising the steps of:

monitoring at least one of the following:
  a) performance counters which determine the activity level of the computer;
  b) a nested interrupt by an operating system of said personal computer; and
  c) for modem tasks, the presence or absence of data transfers,
to determine the useful loading of the central processing unit (CPU) of said personal computer with respect to the activity level of all of the tasks;

determining the amount of time available for the real-time tasks;

selecting the service levels of the currently active real-time tasks in accordance with the amount of time available; and adjusting the size of a buffer into which data received from said real-time devices during a predetermined length of time are placed to be processed later by the real-time tasks associated with said at least one real-time device thereby to match the size of said buffer with the amount of processing time allocated to said currently active real-time tasks.

* * * * *